United States Patent
Kitagawa et al.

(10) Patent No.: US 8,487,564 B2
(45) Date of Patent: Jul. 16, 2013

(54) BRUSHLESS MOTOR CONTROLLER AND METHOD FOR CONTROLLING BRUSHLESS MOTOR

(75) Inventors: Takayuki Kitagawa, Toyohashi (JP); Takehide Omura, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 328 days.

(21) Appl. No.: 13/044,972

(22) Filed: Mar. 10, 2011

(65) Prior Publication Data

US 2011/0227520 A1 Sep. 22, 2011

(30) Foreign Application Priority Data

Mar. 18, 2010 (JP) ................. 2010-062006

(51) Int. Cl.
*H02P 23/14* (2006.01)
*H02P 6/14* (2006.01)

(52) U.S. Cl.
CPC ..................... *H02P 6/142* (2013.01)
USPC ............ 318/400.14; 318/400.13; 318/400.01; 318/700

(58) Field of Classification Search
CPC ....................................................... H02P 6/142
USPC ................... 318/400.14, 400.13, 400.01, 700
See application file for complete search history.

(56) References Cited

U.S. PATENT DOCUMENTS 6,879,129 B2 * 4/2005 Tazawa et al. ................ 318/727

FOREIGN PATENT DOCUMENTS

| JP | 7-184384 A | 7/1995 |
| JP | 2002-315381 A | 10/2002 |
| JP | 3420317 | 4/2003 |
| JP | 2009-268225 A | 11/2009 |

* cited by examiner

*Primary Examiner* — Bentsu Ro
*Assistant Examiner* — David Luo
(74) *Attorney, Agent, or Firm* — Marsh Fischmann & Breyfogle LLP

(57) ABSTRACT

A brushless motor controller is disclosed. The brushless motor controller includes a control unit and a drive timing generation unit. The control unit detects a load state of the motor. The drive timing generation unit generates a normal energizing timing determined by the rotational position of the rotor. Also, the drive timing generation unit generates an advancing angle energizing timing determined by the rotational position of the rotor and advanced by a predetermined amount from the normal energizing timing, generates a delay amount that changes in correspondence with the detected load state of the motor and the rotational speed of the rotor, and generates a final advancing angle energizing timing delayed by the delay amount from the advancing angle energizing timing.

8 Claims, 9 Drawing Sheets

| Electrical Angle | Hall Element | | | FET | | | | | |
|---|---|---|---|---|---|---|---|---|---|
| | | | | U | | V | | W | |
| | Hu | Hv | Hw | 1u | 2u | 1v | 2v | 1w | 2w |
| 0-60 | 1 | 1 | 0 | 0 | 1 | 1 | 0 | 0 | 0 |
| 60-120 | 1 | 0 | 0 | 0 | 1 | 0 | 0 | 1 | 0 |
| 120-180 | 1 | 0 | 1 | 0 | 0 | 0 | 1 | 1 | 0 |
| 180-240 | 0 | 0 | 1 | 1 | 0 | 0 | 1 | 0 | 0 |
| 240-300 | 0 | 1 | 1 | 1 | 0 | 0 | 0 | 0 | 1 |
| 300-360 | 0 | 1 | 0 | 0 | 0 | 1 | 0 | 0 | 1 |

| Electrical Angle | Hall Element | | | FET (120° Advancing) | | | | | |
|---|---|---|---|---|---|---|---|---|---|
| | | | | U | | V | | W | |
| | Hu | Hv | Hw | 1u | 2u | 1v | 2v | 1w | 2w |
| 0-60 | 1 | 1 | 0 | 0 | 0 | 0 | 1 | 1 | 0 |
| 60-120 | 1 | 0 | 0 | 1 | 0 | 0 | 1 | 0 | 0 |
| 120-180 | 1 | 0 | 1 | 1 | 0 | 0 | 0 | 0 | 1 |
| 180-240 | 0 | 0 | 1 | 0 | 0 | 1 | 0 | 0 | 1 |
| 240-300 | 0 | 1 | 1 | 0 | 1 | 1 | 0 | 0 | 0 |
| 300-360 | 0 | 1 | 0 | 0 | 1 | 0 | 0 | 1 | 0 |

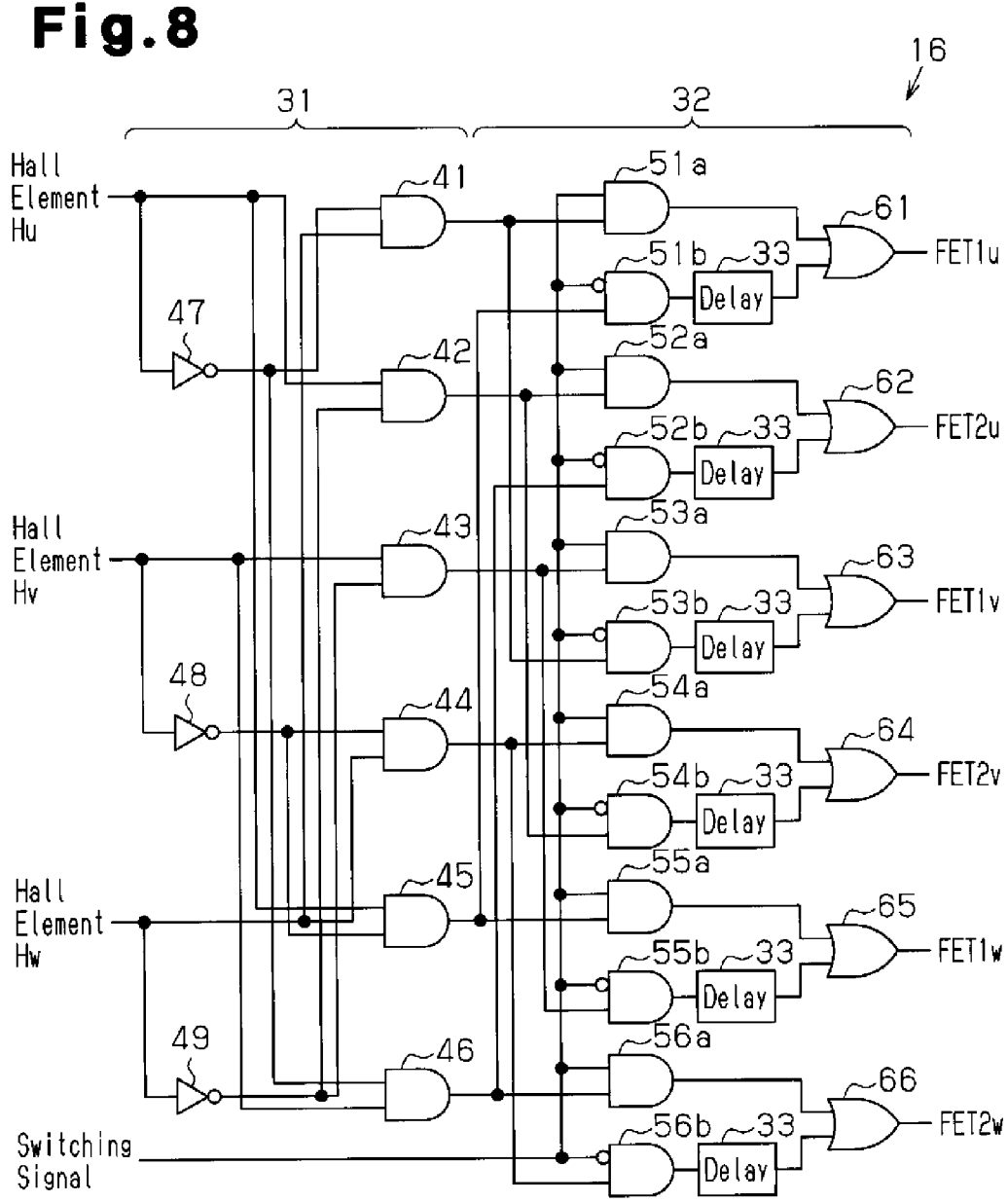

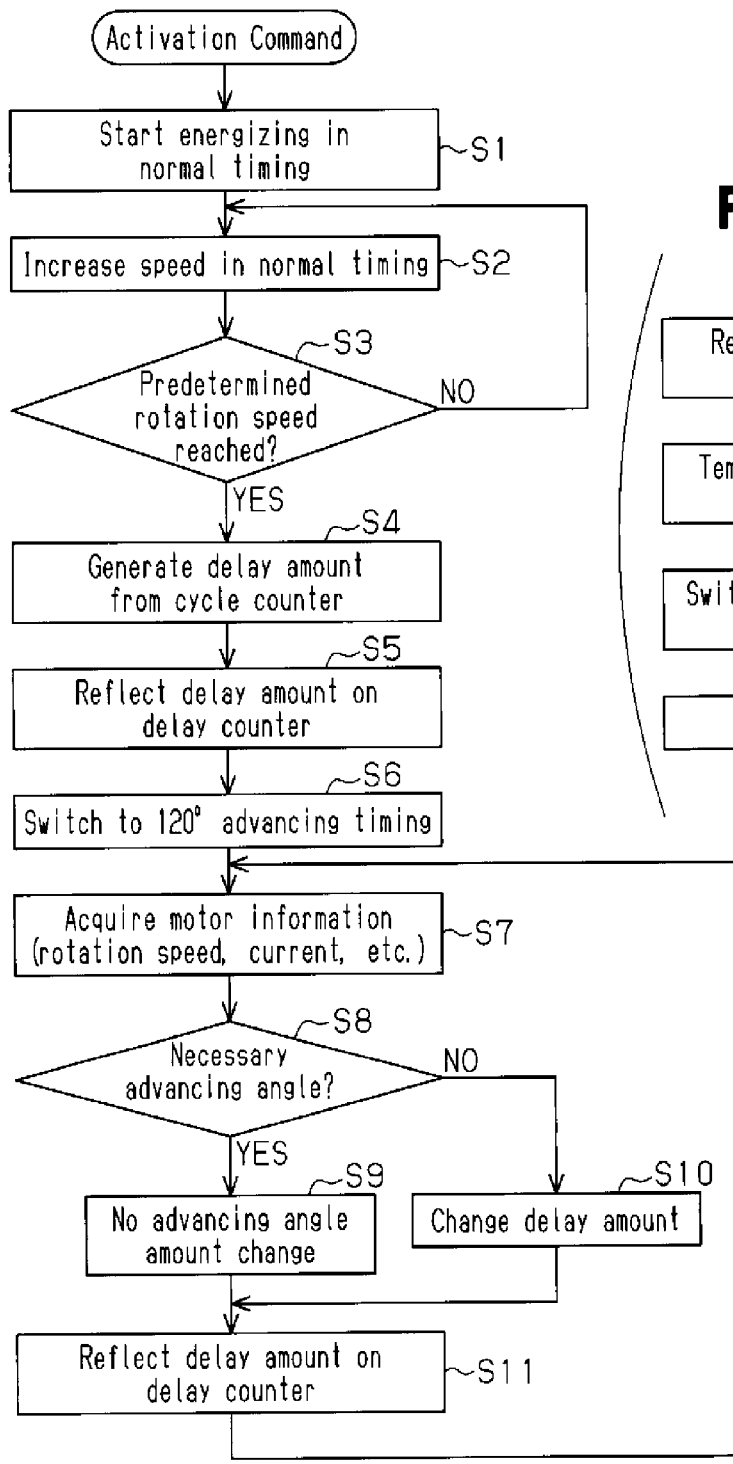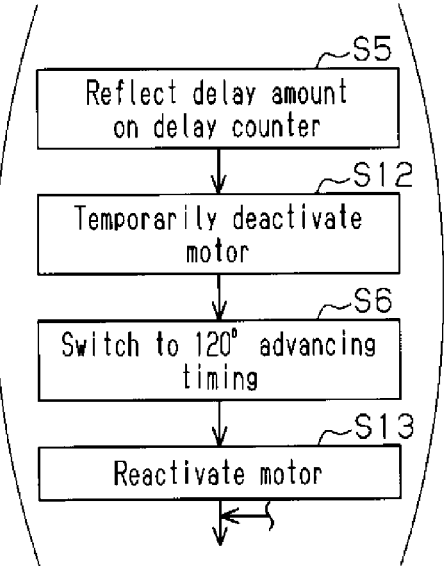

| Electrical Angle | Hall Element (Inverting) | | | FET | | | | | |
|---|---|---|---|---|---|---|---|---|---|
| | | | | U | | V | | W | |
| | Hu | Hv | Hw | 1u | 2u | 1v | 2v | 1w | 2w |
| 0-60 | 0 | 0 | 1 | 1 | 0 | 0 | 1 | 0 | 0 |
| 60-120 | 0 | 1 | 1 | 1 | 0 | 0 | 0 | 0 | 1 |
| 120-180 | 0 | 1 | 0 | 0 | 0 | 1 | 0 | 0 | 1 |
| 180-240 | 1 | 1 | 0 | 0 | 1 | 1 | 0 | 0 | 0 |
| 240-300 | 1 | 0 | 0 | 0 | 1 | 0 | 0 | 1 | 0 |
| 300-360 | 1 | 0 | 1 | 0 | 0 | 0 | 1 | 1 | 0 |

BRUSHLESS MOTOR CONTROLLER AND METHOD FOR CONTROLLING BRUSHLESS MOTOR

BACKGROUND OF THE INVENTION

The present invention relates to a brushless motor controller and a method for controlling a brushless motor that are suitable for stabilizing rotational drive, in particular, during rotational driving in a low-speed rotation state immediately after activation.

In a brushless motor, the rotational position of a rotor is detected by a rotation sensor, and the energizing timing of a stator coil is set based on the detected rotational position to control rotation produced by the motor. Japanese Laid-Open Patent Publication No. 2002-315381 and Japanese Patent No. 3420317 describe examples of such a brushless motor.

During rotational driving of a motor, when the drive current increases as the rotational speed of the motor increases, the energizing timing is delayed due to influence of an armature reaction. Therefore, in order to offset the delay, a so-called angle advancing control may be employed. The angle advancing control sets a rotation sensor at an advancing angle side beforehand to advance the energizing timing, or controls the motor at an advancing angle energizing timing that is advanced from a normal energizing timing and set beforehand as described in Japanese Laid-Open Patent Publication No. 2002-315381.

In the angle advancing control, the energizing timing is over-advanced when the rotational speed of a motor is low. For this reason, the advancing angle energizing timing is delayed toward the normal energizing timing. At this time, a count value corresponding to the rotational speed is set by a delay counter, and the energizing timing is delayed based on the count value of the delay counter.

However, during a period immediately after activation in which the speed of the motor is extremely low, it is desirable that the energizing be performed at the normal energizing timing. Thus, the count value, which increases as the rotational speed of the motor decreases, becomes an extremely large value during the low-speed period. However, the count value of the delay counter is finite. Thus, the count value overflows during the period immediately after activation in which the speed of the motor is extremely low. As a result, the energizing timing is not correctly delayed, and the energizing timing remains deviated from the desirable timing. During the period immediately after activation of the motor in which the speed is extremely low, this lowers the motor efficiency and increases noise and vibration.

In Japanese Patent No. 3420317, angle advancing control which uses the advancing angle energizing timing is not performed, and the optimum energizing timing for the present state is calculated from pulse edges of detection signals output from a rotation sensor to control a motor. Thus, the problems described above do not occur during the period immediately after activation in which the speed of the motor is extremely low. However, complicated computations must be performed for every one of the rotational speed ranges. This results in the need for a CPU that performs such complicated computations with a controller and increases the cost of the controller.

In the above described angle advancing control, the rotational drive is stabilized by setting the advancing angle energizing timing based on the rotational speed of the motor. However, further improvement of the stabilization of the rotational drive is desired, and methods for more appropriately setting the advancing angle energizing timing have been contemplated.

It is an objective of the present invention to provide a brushless motor controller and a method for controlling a brushless motor that stabilize rotation with a simple control.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a diagram showing a logic gate circuit which generates a normal energizing timing and a 120° advancing angle energizing timing;

FIG. 10A is a flowchart illustrating rotational control in the preferred embodiment;

FIG. 10B is a flowchart illustrating rotational control in the preferred embodiment;

DETAILED DESCRIPTION OF THE PREFERRED EMBODIMENTS

A preferred embodiment of the present invention will be described with reference to the drawings.

Figure 1:
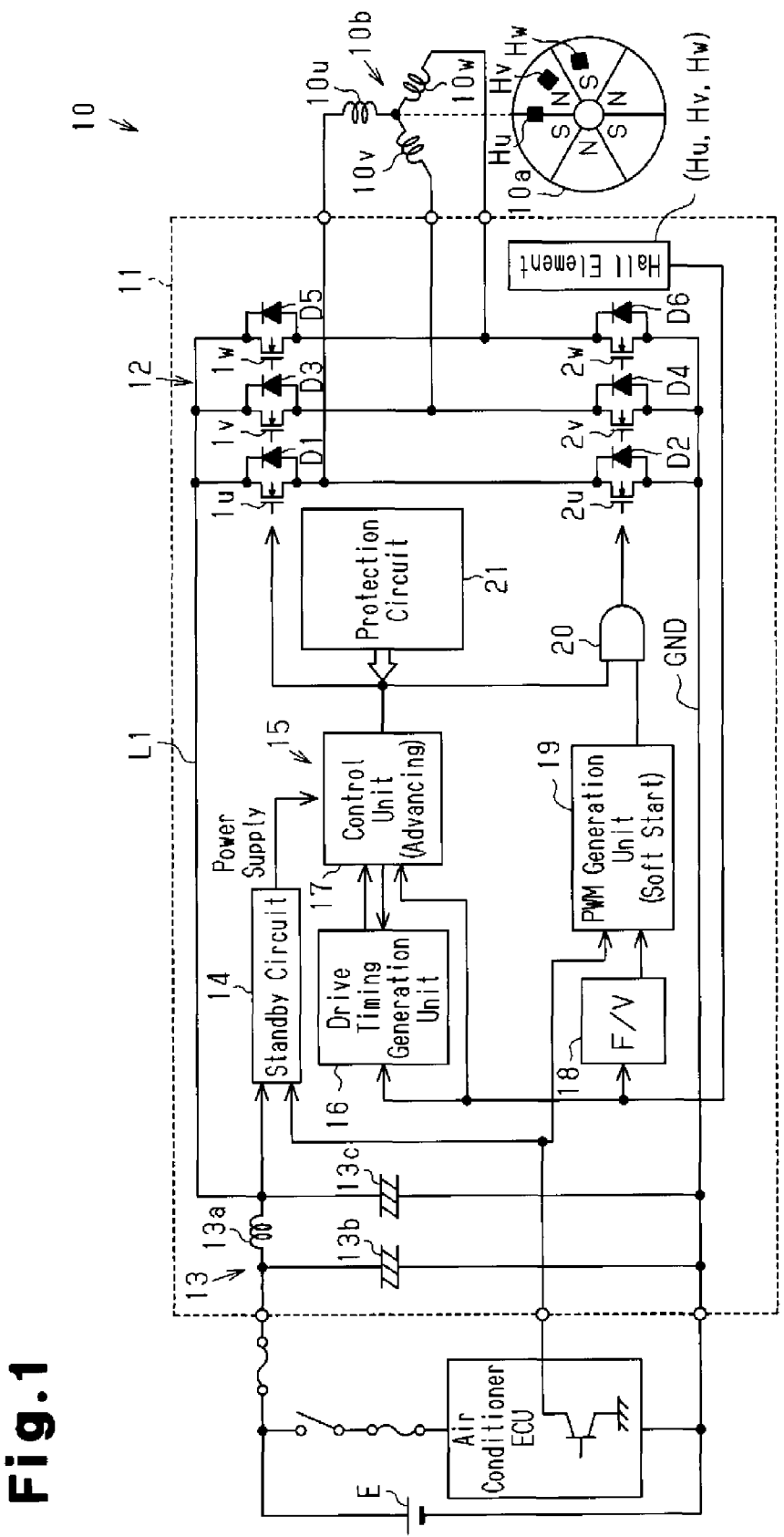
FIG. 1 is a schematic block diagram of a brushless motor and a controller according to a preferred embodiment of the invention.

A brushless motor 10 according to the present embodiment, which his shown in FIG. 1, is used as a blower motor for a vehicle air conditioner. The brushless motor 10 is rotationally driven by receiving power of three phases, namely, the U phase, V phase, and W phase. A controller 11 sets energizing timings for the three phases and generates drive power for each of the phases to control rotation of the brushless motor 10. The controller 11 is integrally arranged on the brushless motor 10.

The controller 11 includes a three-phase inverter circuit 12 to generate drive power for three phases, the phases of which differ from the phase of the DC power supplied from a DC power supply E by 120° with respect to one another. The three-phase inverter circuit 12 includes a bridge circuit using six switching element FETs 1u, 2u, 1v, 2v, 1w, and 2w (FET being the name of the component, and the following remainder being a numeral). Between a high-potential-side power supply line L1 and a ground line GND, the FET 1u and the FET 2u for the U phase are connected in series, the FET 1v and the FET 2v for the V phase are connected in series, and the FET 1w and the FET 2w for the W phase are connected in series. The DC power from the DC power supply E is stabilized by a power supply stabilizing circuit 13, which includes a choke coil 13a and smoothing capacitors 13b and 13c, and supplied to the high-potential-side power supply line L1 and the ground line GND. Diodes D1 to D6, which generate free-wheeling currents, are reversely connected to the FETs 1u, 2u, 1v, 2v, 1w, and 2w, respectively.

The brushless motor 10 includes a 6-pole rotatable rotor 10a having different magnetic poles arranged in angular intervals of 60°. A stator 10b includes U-phase, V-phase, and W-phase stator coils 10u, 10v, and 10w configured by a Y-connection (star connection). An output terminal between the U-phase FETs 1u and 2u is connected to one terminal of the U-phase coil 10u, an output terminal between the V-phase FETs 1v and 2v is connected to one terminal of the V-phase coil 10v, and an output terminal between the W-phase FETs 1w and 2w is connected to one terminal of the W-phase coil 10w. Drive power for the phases generated by switch-controlling the FETs 1u, 2u, 1v, 2v, 1w, and 2w of the inverter circuit 12 at predetermined timings are supplied to coils 10u, 10v, and 10w for the phases.

Figures 2, 3:
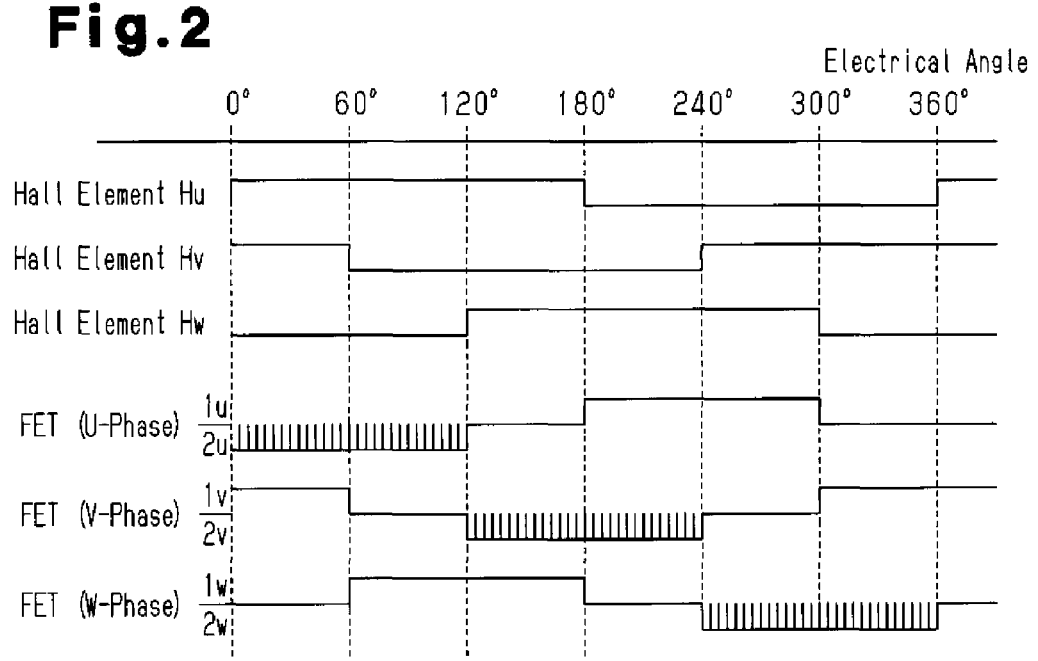
FIG. 2 is a waveform chart showing a drive control signal for a normal energizing timing.
FIG. 3 is a truth table for the normal energizing timing of FIG. 2.
Figure 5:
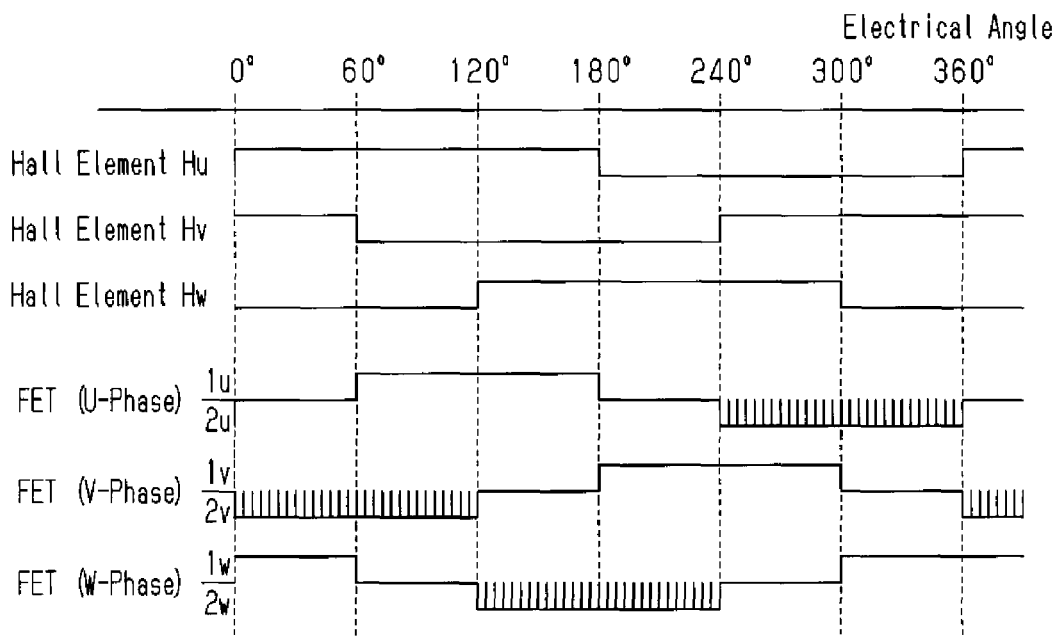
FIG. 5 is a waveform chart showing a drive control signal for a 120° advancing angle energizing timing.

FIGS. 2 and 5 show timings for the switch-control. In the U-phase FETs 1u and 2u, the FET 2u has an OFF period at an electrical angle of 60° subsequent to an ON period of an electrical angle of 120°. Then, the FET 1u repeats the OFF period at an electrical angle of 60° subsequent to the ON period at an electrical angle of 120°. In the V-phase FETs 1v and 2v and the W-phase FETs 1w and 2w, ON and OFF periods are set in the same manner. A phase difference of 120° is set between the phases such that the end of the ON period of the U-phase FET 1u matches with the start of the ON period of the V-phase FET 1v, and the end of the ON period of the V-phase FET 1v matches with the start of the ON period of the W-phase FET 1w. This supplies drive power (not shown in FIG. 2) of the phases having phase differences of 120° to the coils 10u, 10v, and 10w for the phases of the motor 10.

From hall elements Hu, Hv, and Hw serving as a rotation sensor (described below), pulsed detection signals having phase differences of 120° are obtained as the rotor 10a rotates. At a normal energizing timing shown in FIG. 2, the FET 2u is turned on based on a rising edge of the U-phase hall element Hu to an H level, and the FET 1u is turned on based on a falling edge of the hall element Hu to an L level. The FET 2w is turned on based on a rising edge of the V-phase hall element Hv to an H level, and the FET 1w is turned on based on a falling edge of the hall element Hv to an L level. The FET 2v is turned on based on a rising edge of the W-phase hall element Hw to an H level, and the FET 1v is turned on based on a falling edge of the hall element Hw to an L level. A 120° advancing angle energizing timing is advanced by 120° from the normal energizing timing.

Among the FETs 1u, 2u, 1v, 2v, 1w, and 2w, the lower FETs 2u, 2v, and 2w arranged at the side of the ground line GND are PWM-controlled such that the FETs 2u, 2v, and 2w are turned on and off at a higher frequency in an ON period (in FIG. 2, a PWM control period is indicated by vertical stripes). In this manner, the rotational speed of the brushless motor 10 (rotor 10a) is controlled. The switching control of the FETs 1u, 2u, 1v, 2v, 1w, and 2w is performed by a control circuit 15.

As shown in FIG. 1, the control circuit 15 includes a drive timing generation unit 16, a control unit (control switching unit and load state detecting unit) 17, an F/V converter 18, and a PWM generation unit 19, which are operate based on operational power supplied from a standby circuit 14. The standby circuit 14 generates operational power based on an activation command signal from an air conditioner ECU arranged outside the motor 10 and supplies the operational power to each unit.

In the brushless motor 10, the three hall elements Hu, Hv, and Hw are arranged at 40° intervals (120° intervals in terms of electrical angle) to detect rotational positions (magnetic pole positions) of the 6-pole rotor 10a for each phase. The hall elements Hu, Hv, and Hw are arranged at a position corresponding to advancing angle of 0°. Detection signals output from the hall elements Hu, Hv, and Hw as the rotor 10a rotates have pulsed shapes having phase differences of 120° with respect to one another (see FIG. 2), and are output to the drive timing generation unit 16, the control unit 17, and the F/V converter 18.

Based on detection signals input from the hall elements Hu, Hv, and Hw, the drive timing generation unit 16 sets the present energizing timings for the coils 10u, 10v, and 10w in each of the phases in correspondence with the rotational positions of the rotor 10a, that is, the drive timings of the FETs 1u, 2u, 1v, 2v, 1w, and 2w. The configuration of the drive timing generation unit 16 will be described in detail later. The control unit 17 operates a cycle counter based on the detection signals from the hall elements Hu, Hv, and Hw and determines the advancing angle amount of the present energizing timing from the rotational speed of the rotor 10a obtained by the cycle counter to control the drive timing generation unit 16. The control unit 17 directly outputs final drive control signals based on the energizing timings generated by the drive timing generation unit 16 to the FETs 1u, 1v, and 1w and outputs the final drive control signals to the FETs 2u, 2v, and 2w through an AND circuit 20.

The F/V converter 18 converts the frequency of the detection signals from the hall elements Hu, Hv, and Hw corresponding to the rotational speed of the rotor 10a into voltage and outputs the converted voltage to the PWM generation unit 19. The PWM generation unit 19 recognizes the rotational speed of the rotor 10a from the converted voltage and outputs a PWM control signal to the AND circuit 20 such that the PWM control signal is added to a drive control signal from the control unit 17. The PWM generation unit 19 gradually increases a duty ratio of the PWM control signal based on an activation command signal from the air conditioner ECU to perform a soft start in which the rotational speed is gradually increased. The PWM generation unit 19, after the soft start, controls the duty ratio of the PWM control signal to so that the rotational speed of the rotor 10a becomes constant at a speed set by a speed command value from a speed command value setting unit (not shown). This changes actual ON times in the ON period of the lower FETs 2u, 2v, and 2w to adjust the drive power supplied to the brushless motor 10 and control the rotational speed of the brushless motor 10.

The control circuit 15 includes a protection circuit 21. The protection circuit 21 forcibly stops the control unit 17 from outputting drive control signals to the FETs 1u, 2u, 1v, 2v, 1w, and 2w to stop the operations of the FETs 1u, 2u, 1v, 2v, 1w, and 2w and the rotation of the brushless motor 10. This protects the brushless motor 10 and the controller 11.

The configuration of the drive timing generation unit 16 will now be described in detail, and control executed by the control unit 17 will be discussed. The drive timing generation unit 16, as shown in FIG. 8, includes a basic timing generation unit 31, an output switching unit 32, and a delay circuit 33. The basic timing generation unit 31 is formed by a logic gate circuit. The drive timing generation unit 16 is configured so as to enable generation of an energizing timing, the advancing angle amount of which is variable from 0° to 120°, based on the detection signals output from the hall elements Hu, Hv, and Hw. In the brushless motor 10, the maximum value for the necessary advancing angle amount is set to, for example, 80° due to influence of an armature reaction or the like caused by the configuration of the brushless motor 10. The drive timing generation unit 16 generates an energizing timing that is adjusted to be delayed by a delay count operation from the 120° advancing angle energizing timing.

Figure 4:
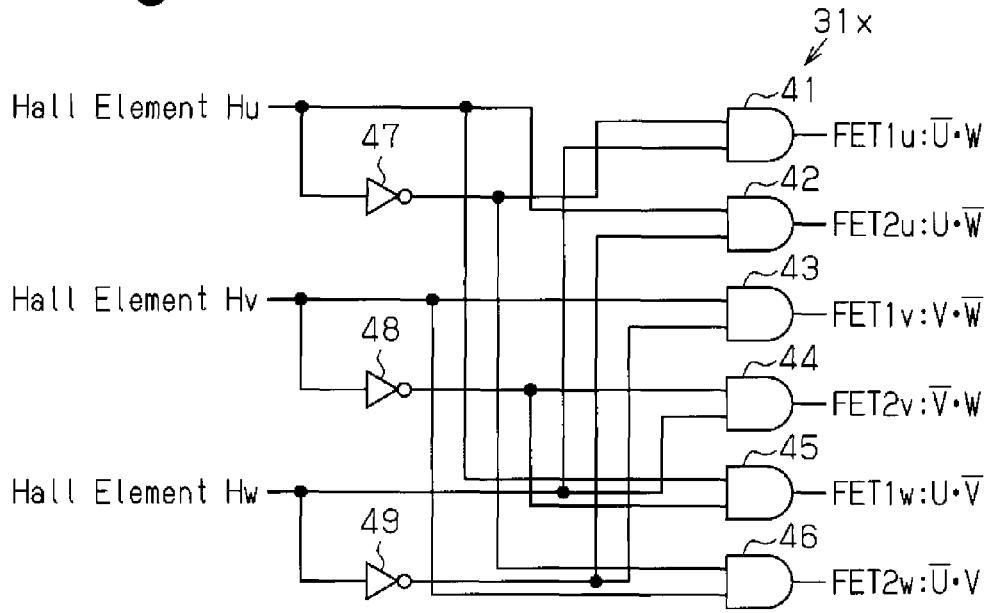
FIG. 4 is a diagram showing a logic gate circuit which generates the normal energizing timing of FIG. 2.

FIG. 4 shows the configuration of a logic gate circuit 31x, which generates a normal energizing timing as shown in FIG. 2, based on detection signals output from the hall elements Hu, Hv, and Hw, and FIG. 3 shows a truth table of the normal energizing timing.

The logic gate circuit 31x includes six AND circuits 41 to 46. The detection signal from the hall element Hu is input to one input terminal of the AND circuit 41 through an inverting circuit 47, and the detection signal from the hall element Hw is input to the other input terminal of the AND circuit 41. More specifically, an inverted detection signal from the hall element Hu and the detection signal from the hall element Hw are input to the AND circuit 41, and an output signal is output to the FET 1u.

The detection signal from the hall element Hu is input to one input terminal of the AND circuit 42, and the detection signal from the hall element Hw is input to the other input terminal of the AND circuit 42 through an inverting circuit 49. More specifically, the detection signal from the hall element Hu and the inverted detection signal from the hall element Hw are input to the AND circuit 42, and an output signal is output to the FET 2u.

The detection signal from the hall element Hv is input to one input terminal of the AND circuit 43, and the detection signal from the hall element Hw is input to the other input terminal of the AND circuit 43 through an inverting circuit 49. More specifically, the detection signal from the hall element Hv and the inverted detection signal from the hall element Hw are input to the AND circuit 43, and an output signal is output to the FET 1v.

The detection signal from the hall element Hv is input to one input terminal of the AND circuit 44 through an inverting circuit 98, and the detection signal from the hall element Hw is input to the other input terminal of the AND circuit 44. More specifically, the inverted detection signal from the hall element Hv and the detection signal from the hall element Hw are input to the AND circuit 44, and an output signal is output to the FET 2v.

The detection signal from the hall element Hu is input to one input terminal of the AND circuit 45, and the detection signal from the hall element Hv is input to the other input terminal of the AND circuit 45 through the inverting circuit 48. More specifically, the detection signal from the hall element Hu and the inverted detection signal from the hall element Hv are input to the AND circuit 45, and an output signal is output to the FET 1w.

The detection signal from the hall element Hu is input to one input terminal of the AND circuit 46 through the inverting circuit 47, and the detection signal from the hall element Hv is input to the other input terminal of the AND circuit 47. More specifically, the inverted detection signal from the hall element Hu and the detection signal from the hall element Hv are input to the AND circuit 46, and an output signal is output to the FET 2w. In this manner, the logic gate circuit 31x which generates a normal energizing timing based on the detection signals from the hall elements Hu, Hv, and Hw can be configured as described above.

Figures 6, 7:
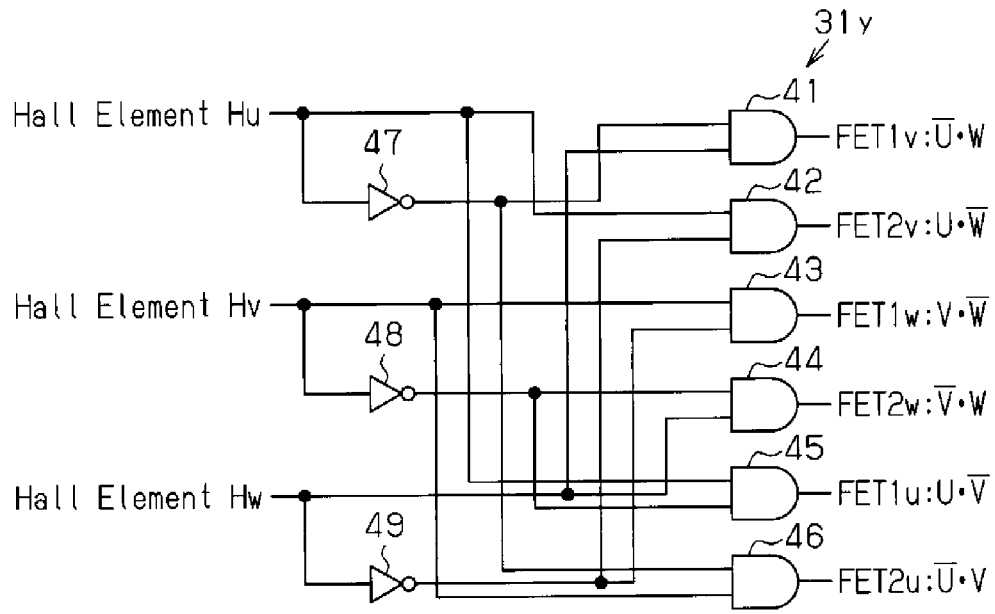
FIG. 6 is a truth table for the 120° advancing angle energizing timing.
FIG. 7 is a diagram showing a logic gate circuit which generates the 120° advancing angle energizing timing.

FIG. 7 shows the configuration of a logic gate circuit 31y, which generates a 120° advancing angle energizing timing based on the detection signals from the hall elements Hu, Hv, and Hw, and FIG. 6 shows a truth table of the 120° advancing angle energizing timing.

As apparent from FIG. 7, the logic gate circuit 31y has the same configuration as that of the logic gate circuit 31x. However, an output signal from the AND circuit 41 is output to the FET 1v, an output signal from the AND circuit 42 is output to the FET 2v, and an output signal from the AND circuit 43 is output to the FET 1w. Furthermore, an output signal from the AND circuit 44 is output to the FET 2w, an output signal from the AND circuit 45 is output to the FET 1u, and an output signal from the AND circuit 46 is output to the FET 2u. In this manner, the normal energizing timing and the 120° advancing angle energizing timing can be generated just by changing the output signals from the AND circuits 41 to 44 using the logic gate circuits 31x and 31y having the same configurations.

Accordingly, in the preferred embodiment, as shown in FIG. 8, the drive timing generation unit 16 uses the logic gate circuit 31x shown in FIG. 4 or the logic gate circuit 31y shown in FIG. 7 as the basic timing generation unit 31 and is configured so that output signals from the AND circuits 41 to 46, which form the basic timing generation unit 31, are switched by the output switching unit 32. The output switching unit 32 has twelve AND circuits 51a, 51b to 56a, and 56b, and six OR circuits 61 to 66.

An output signal from the AND circuit 41 of the basic timing generation unit 31 is input to one input terminal of the AND circuit 51a of the output switching unit 32, and a switching signal output from the control unit 17 is input to the other input terminal of the AND circuit 51a. An output signal from the AND circuit 51a is input to a first input terminal of the OR circuit 61. An output signal from the AND circuit 45 is input to one input terminal of the AND circuit 51b, and an inverted signal of a switching signal output from the control unit 17 is input to the other input terminal of the AND circuit 51b. An output signal from the AND circuit 51b is input to a second input terminal of the OR circuit 61 through the delay circuit 33. The OR circuit 61 outputs the output signal to the FET 1u.

An output signal from the AND circuit 42 is input to one input terminal of an AND circuit 52a, and a switching signal output from the control unit 17 is input to the other input terminal of the AND circuit 52a. An output signal from the AND circuit 52a is input to a first input terminal of the OR circuit 62. Further, an output signal from the AND circuit 46 is input to one input terminal of an AND circuit 52b, and an inverted signal of the switching signal output from the control unit 17 is input to the other input terminal of the AND circuit 52b. An output signal from the AND circuit 52b is input to a second input terminal of the OR circuit 62 through the delay circuit 33. The OR circuit 62 outputs the output signal to the FET 2u.

An output signal from the AND circuit 43 is input to one input terminal of an AND circuit 53a, and a switching signal output from the control unit 17 is input to the other input terminal of the AND circuit 53*a*. An output signal from the AND circuit 53*a* is input to a first input terminal of the OR circuit 63. An output signal from the AND circuit 41 is input to one input terminal of an AND circuit 53*b*, and an inverted signal of the switching signal output from the control unit 17 is input to the other input terminal of the AND circuit 53*b*. An output signal from the AND circuit 53*b* is input to a second input terminal of the OR circuit 63 through the delay circuit 33. The OR circuit 63 outputs the output signal to the FET 1*v*.

An output signal from the AND circuit 44 is input to one input terminal of an AND circuit 54*a*, and the switching signal output from the control unit 17 is input to the other input terminal of the AND circuit 54*a*. An output signal from the AND circuit 54*a* is input to a first input terminal of the OR circuit 64. An output signal from the AND circuit 42 is input to one input terminal of an AND circuit 54*b*, and the inverted signal of the switching signal output from the control unit 17 is input to the other input terminal of the AND circuit 54*b*. An output signal from the AND circuit 54*b* is input to a second input terminal of the OR circuit 64 through the delay circuit 33. The OR circuit 64 outputs the output signal to the FET 2*v*.

An output signal from the AND circuit 95 is input to one input terminal of an AND circuit 55*a*, and the switching signal output from the control unit 17 is input to the other input terminal of the AND circuit 55*a*. An output signal from the AND circuit 55*a* is input to a first input terminal of an OR circuit 65. An output signal from the AND circuit 43 is input to one input terminal of an AND circuit 55*b*, and the inverted signal of the switching signal output from the control unit 17 is input to the other input terminal of the AND circuit 55*b*. An output signal from the AND circuit 55*b* is input to a second input terminal of the OR circuit 65 through the delay circuit 33. The OR circuit 65 outputs the output signal to the FET 1*w*.

An output signal from the AND circuit 46 is input to one input terminal of the AND circuit 56*a*, and the switching signal output from the control unit 17 is input to the other input terminal of the AND circuit 56*a*. An output signal from the AND circuit 56*a* is input to a first input terminal of the OR circuit 66. An output signal from the AND circuit 44 is input to one input terminal of the AND circuit 56*b*, and the inverted signal of the switching signal output from the control unit 17 is input to the other input terminal of the AND circuit 56*b*. An output signal from the AND circuit 56*b* is input to a second input terminal of the OR circuit 66 through the delay circuit 33. The OR circuit 66 outputs the output signal to the FET 2*w*.

The control unit 17 outputs the switching signal to the drive timing generation unit 16 having the above configuration. In a low speed range where the rotational speed of the rotor 10*a* is less than a predetermined value (for example 800 [rpm]), the control unit switches the switching signal to an H level to use a normal energizing timing. When the rotational speed is a range not less than the predetermined value, the control unit 17 switches the switching signal to an L level to use a 120° advancing angle energizing timing.

When the switching signal from the control unit 17 has an H level, in the drive timing generation unit 16, output signals from the AND circuits 41 to 46 of the basic timing generation unit 31 are output to latter stages through the AND circuits 51*a* to 56*a*. For this reason, the drive control signals (see FIG. 2) having the normal energizing timing are generated from the basic timings, which are generated from the detection signals of the hall elements Hu, Hv, and Hw, and then output to the gates of the FETs 1*u*, 2*u*, 1*v*, 2*v*, 1*w*, and 2*w*.

When the switching signal from the control unit 17 has an L level, in the drive timing generation unit 16, output signals from the AND circuits 41 to 46 of the basic timing generation unit 31 are output to latter stages through the AND circuits 51*b* to 56*b*. For this reason, the drive control signals (see FIG. 5) having the 120° advancing angle energizing timing are generated from the basic timing, which are generated from the detection signals from the hall elements Hu, Hv, and Hw. The drive control signals having the 120° advancing angle energizing timing are subjected to an advancing angle adjustment of 0° to 120° by a delay count operation of the delay circuit 33 and output to the gates of the FETs 1*u*, 2*u*, 1*v*, 2*v*, 1*w*, and 2*w*.

The advancing angle adjustment (delay adjustment) of the present embodiment is executed by the voltage applied to the coils 10*u*, 10*v*, and 10*w* of the motor 10 in addition to the rotational speed of the rotor 10*a* of the motor 10. This is because the advancing angle amount changes in accordance with not only the rotational speed, but also the voltage applied to the motor 10, that is, the state of load of the motor 10. Taking this into consideration, the advancing angle amount is adjusted in accordance with the state of load. The voltage applied to the motor 10 is calculated from the duty ratio of the PWM control and the source voltage of the DC power supply E.

Rotational control performed by the control circuit 15 of the preferred embodiment will now be discussed with reference to the flowchart of FIG. 10A.

First, in step S1, based on an activation command signal from the air conditioner ECU, the brushless motor 10 is activated, and rotational drive of the brushless motor 10 is started. During the activation, the switching signal from the control unit 17 has an H level. In the drive timing generation unit 16 shown in FIG. 8, drive control signals of the normal energizing timing are generated from the detection signals of the hall elements Hu, Hv, and Hw, and the drive control signals are output to the FETs 1*u*, 2*u*, 1*v*, 2*v*, 1*w*, and 2*w* of the inverter circuit 12. The FETs 1*u*, 2*u*, 1*v*, 2*v*, 1*w*, and 2*w* are turned on or off based on the drive control signals of the normal energizing timing, and drive power is supplied to the brushless motor 10.

In step S2, through soft start control performed by the PWM generation unit 19 during activation, the duty ratio for the drive control signal of the normal energizing timing is gradually increased from a low level. This gradually increases the drive power supplied to the brushless motor 10 and gradually increases the rotational speed of the rotor 10*a*.

In step S3, it is determined whether or not the rotational speed of the rotor 10*a* has reached a predetermined value (for example, 800 [rpm]) based on the rotational speed of the rotor 10*a* obtained by the cycle counter in the control unit 17 that is operated based on the detection signals from the hall elements Hu, Hv, and Hw. More specifically, when the present normal energizing timing is switched to the 120° advancing angle energizing timing, it is determined whether the rotational speed of the rotor 10*a* is so slow that the delay counter of the delay circuit 33 is in an overflow section in which it overflows. When the rotational speed of the rotor 10*a* is lower than the predetermined value, steps S2 and S3 are repeated until the rotational speed becomes greater than or equal to the predetermined value. When the rotational speed of the rotor 10*a* is greater than or equal to the predetermined value, it is determined that normal operations may be performed with rotational control performed with the 120° advancing angle energizing timing without causing the delay counter to overflow. Thus, the processing proceeds to step S4.

In step S4, to prepare for switching to the 120° advancing angle energizing timing in step S6, a delay amount for the 120° advancing angle energizing timing is generated from the cycle counter within the control unit 17, which reflects the present rotational speed of the rotor 10a. Immediately after the switching from the normal energizing timing, a delay amount for the 120° advancing angle energizing timing is set to 120°, that is, the advancing angle amount is adjusted to 0°. Immediately after the switching of the normal energizing timing, the delay amount is set to the maximum value of 120°, so that a delay of 120° for the 120° advancing angle energizing timing is created. That is, a timing equivalent to the normal energizing timing is established. Accordingly, when the normal energizing timing is switched to the 120° advancing angle energizing timing, the energizing timing is not displaced.

In step S5, to prepare for switching to the 120° advancing angle energizing timing in step S6, the delay amount of 120° generated in step S4 for the 120° advancing angle energizing timing is set (reflected) as a count value of the delay counter of the delay circuit 33.

In step S6, a switching signal input to the drive timing generation unit 16 shown in FIG. 8 is switched from an H level to an L level, so that the normal energizing timing is switched to the 120° advancing angle energizing timing. The FETs 1u, 2u, 1v, 2v, 1w, and 2w of the inverter circuit 12 are turned on and off based on the drive control signal having the advancing angle energizing timing, which is adjusted to be advanced in correspondence with the present rotation state of the rotor 10a.

In step S7, the control unit 17 acquires motor information, which includes the rotational speed, drive current, and applied voltage.

In step S8, the control unit 17 determines from the acquired motor information whether or not the present advancing angle amount is the necessary advancing angle amount, that is, whether or not the advancing angle amount conforms to the present rotation state of the rotor 10a. When it is determined that the advancing angle amount of the rotor 10a conforms to the present rotation state, it is determined in step S9 that changes will not be made to the advancing angle amount and the processing proceeds to step S11. When it is determined that the advancing angle amount does not conform to the present rotation state of the rotor 10a, the delay angle amount is changed in step S10.

Figure 9A:
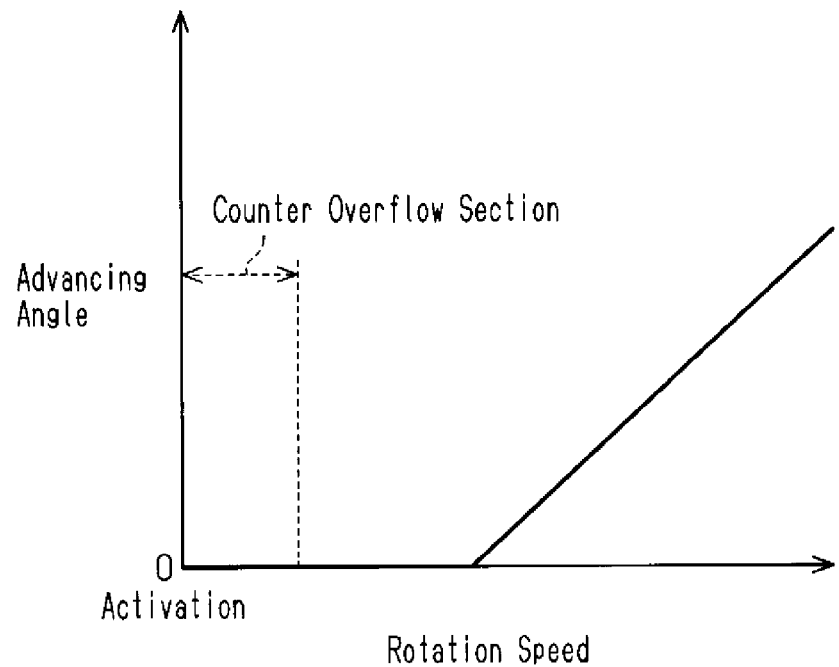
FIG. 9A is a diagram illustrating rotational speed control in the preferred embodiment.

Immediately after the switching to the 120° advancing angle energizing timing, the advancing angle amount is adjusted to 0°, that is, the delay amount for the 120° advancing angle energizing timing is set to 120°. However, as shown in FIG. 9A, the delay amount for the 120° advancing angle energizing timing is gradually reduced from 120°, so that the advancing angle amount is gradually increased from 0° as the rotational speed of the rotor 10a is increased.

Figure 11:
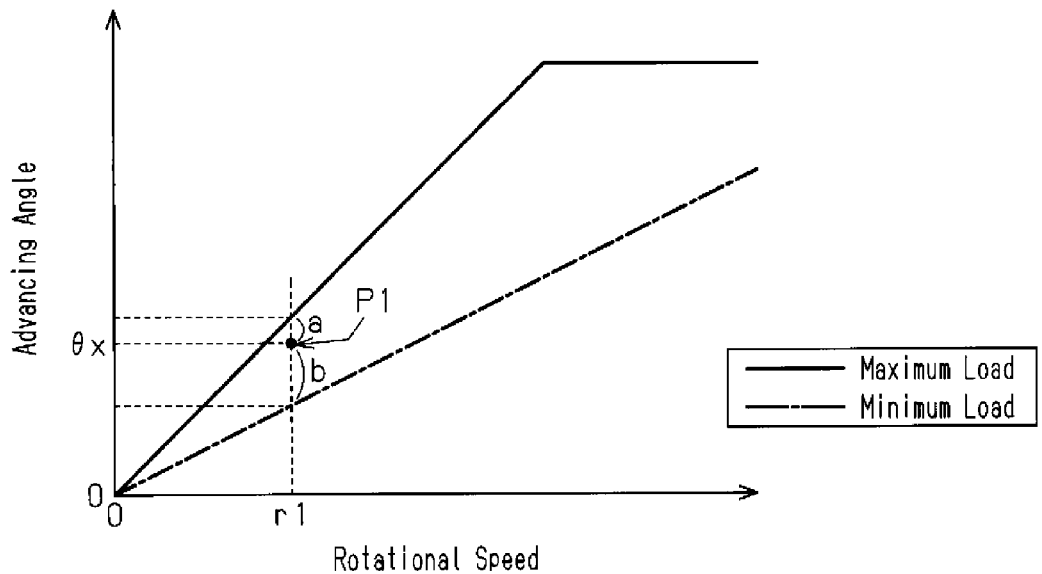
FIG. 11 is a correlation diagram of the rotational speed and the advancing angle amount in accordance with the load state of the motor.

Also, the advancing angle amount varies in accordance with the load state of the motor 10 as shown in FIG. 11, even if the rotational speed is the same. FIG. 11 represents the correlation between the rotational speed and the advancing angle amount in a state where the load state of the motor 10 is the maximum load (shown by a solid line in FIG. 11), and a state in which the load state of the motor 10 is the minimum load (shown by a line formed by a long dash alternating with one short dash). The maximum load and the minimum load refer to the maximum value and the minimum value in a range in which the motor 10 is used in a system, or a blower motor for a vehicle air conditioner in the present embodiment. The advancing angle amount relative to the rotational speed of the rotor 10a is linearly increased as the rotational speed increases both at the maximum and minimum loads, and the greater the load, the greater the degree of increase becomes. That is, at the same rotational speed, the advancing angle amount is greater at the maximum load than at the minimum load. The advancing angle value relative to the rotational speed at the maximum load reaches the peak, or the maximum value, of 80°, for example, when the rotational speed is greater than or equal to a predetermined value (4000 rpm).

Accordingly, when the load state of the motor 10 is, for example, a load lower than expected, if the advancing angle amount is set using a previously prepared correlation map, the advancing angle amount will be excessively great. In this case, the motor efficiency is not sufficiently improved, and noise and vibration are not sufficiently reduced. Rather, these may deteriorate. In contrast, when the load state of the motor 10 is a load higher than expected, if the advancing angle amount is set using a previously prepared correlation map, the advancing angle amount will be insufficient. This leads to the same problems as those in the state of excessive advancing angle amount.

Accordingly, in the present embodiment, a correlation map of rotational speed and advancing angle amount corresponding to the load state of the motor 10 is prepared as shown in FIG. 11. The control unit 17 refers to the correlation map to set an advancing angle amount corresponding to the rotational speed at each load state of the motor 10. The correlation map used in the present embodiment is used only when the load is the maximum load or the minimum load. In load states between the maximum load and the minimum load, calculation is performed based on the ratios of the maximum load and the minimum load, which will be discussed below.

Figure 12:
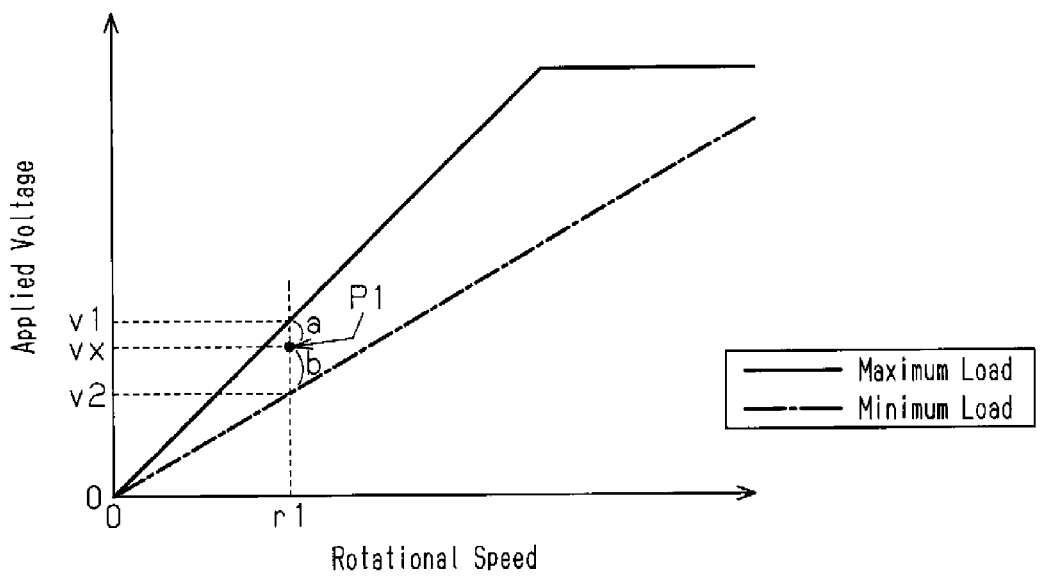
FIG. 12 is a correlation diagram of the rotational speed and the applied voltage in accordance with the load state of the motor.

FIG. 12 represents the correlation between the rotational speed of the rotor 10a and the voltage applied to the motor 10 in a state where the load state of the motor 10 is the maximum load and a state in which the load state of the motor 10 is the minimum load. The applied voltage in relation to the rotational speed in each load state has the same correlation as that between the rotational speed and the advancing angle amount in FIG. 11. The present embodiment provides the correlation map between the rotational speed and the applied voltage in relation to the load state of the motor 10 shown in FIG. 12. The control unit 17 refers to the correlation map to calculate the load state from the voltage applied to the motor 10.

For example, the voltage applied to the motor 10 when the rotor 10a is rotated at a rotational speed r1 is v1 at the maximum load and v2 at the minimum load. The present load state of the motor 10, at which the voltage applied to the motor 10 is vx, is calculated using the applied voltages v1 and v2. The voltage applied to the motor 10 is calculated from the duty ratio of the PWM control and the source voltage of the DC power supply E. The present voltage vx applied to the motor 10 corresponds to point P1 obtained by subtracting a ratio a from the applied voltage v1 at the maximum load or point P1 obtained by adding a ratio b to the applied voltage v2 at the minimum load. That is, the present load state is calculated based on the maximum load or the minimum load. When the voltage applied to the motor 10 is outside the range between v1 and v2, the cause is an irregularity on the system affected by disturbance. Thus, the present load state of the motor is calculated using the maximum and minimum applied voltages v1 and v2.

When the present load (point P1) of the motor 10 in the system is calculated, an advancing angle amount θx is calculated based on the ratios a and b from the maximum load or the minimum load at the rotational speed r1 based on the correlation map of FIG. 11. Then, the delay amount for the 120° advancing angle energizing timing is calculated.

In step S11, the delay amount in step S9 or S10 is reflected on the delay counter and adjusted to the advancing angle amount of the advancing angle energizing timing that conforms to the present rotation state. By repeating steps S7 to S11, the delay amounts in steps S9 and S10 are adjusted to advancing angle energizing timings that conform to the present rotation state.

Figure 9B:
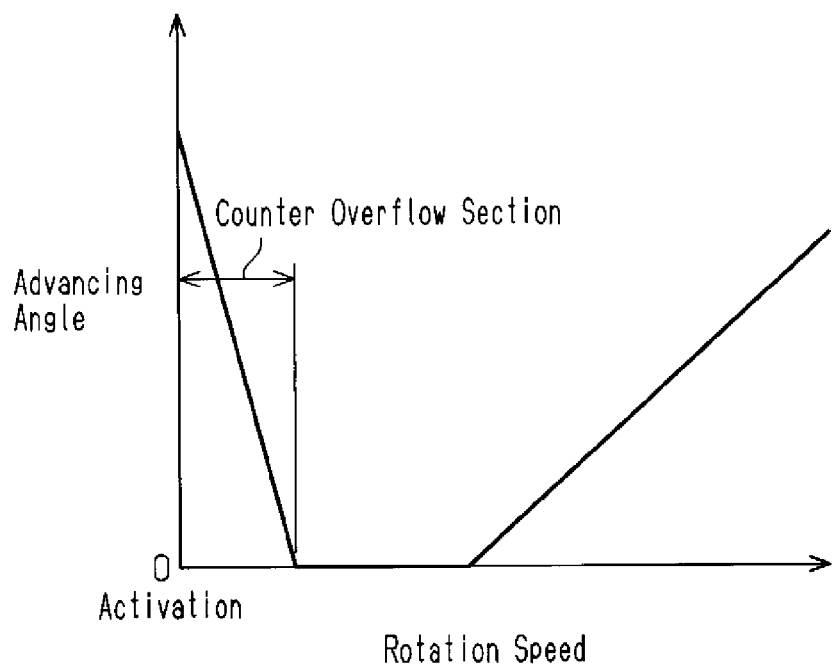
FIG. 9B is a diagram illustrating rotational speed control in the prior art.

In the preferred embodiment in which rotational control is performed in accordance with steps S1 to S11, as shown in FIG. 9A, rotational control with the normal energizing timing (zero advancing angle) is performed during the period immediately after activation in which the speed is extremely low. Then, after the rotational speed increases to a rotational speed at which the delay counter of the advancing angle energizing timing does not overflow, the rotational control is switched to rotational control with the advancing angle energizing timing. As shown in FIG. 9B, in the prior art, the rotational control with an advancing angle energizing timing is always performed. Thus, the delay counter overflows during the period immediately after activation in which the speed is extremely low, and the advancing angle energizing timing cannot be accurately delayed. This lowers the motor efficiency and increases noise and vibration since energizing cannot be performed at an optimum timing. However, the preferred embodiment prevents such a situation from occurring. Accordingly, in the preferred embodiment, rotational drive of the brushless motor 10 is stabilized even from the period immediately after activation in which the speed is extremely low.

Also, during the rotational control with the advancing angle energizing timing, the advancing angle amount is optimized so as not to be excessive or insufficient in accordance with the load state of the motor 10. Thus, even in the rotational speed range in which the control is switched to the advancing angle energizing timing, the motor efficiency is improved and noise and vibration are reliably reduced, so that the rotational drive of the motor is stabilized in this speed range. Particularly, in a case where the motor 10 is used as a blower motor for a vehicle air conditioner as in the present embodiment, the flow rate of blown air varies depending on the class of the car on which the motor 10 is mounted. Accordingly, the load acting on the motor 10 varies. It is therefore significantly advantageous to apply the present embodiment to a vehicle air conditioner.

Next, advantages of the present embodiment will be described.

(1) In the preferred embodiment, the drive timing generation unit 16 generates a normal energizing timing and a 120° advancing angle energizing timing based on rotational positions (detection signals from the hall elements Hu, Hv, and Hw) of the rotor 10a. Further, the control unit 17 calculates a delay amount for the 120° advancing angle energizing timing in correspondence with the load state (applied voltage) of the motor 10 and the rotational speed of the rotor 10a. When the rotational speed of the rotor 10a is lower than the predetermined value, the control unit 17 performs rotational control with the normal energizing timing. When the rotational speed of the rotor 10a is greater than or equal to the predetermined value, the control unit 17 performs rotational control with the advancing angle energizing timing, which is obtained after reflection of the delay amount. More specifically, in the period immediately after activation in which the speed is extremely low, angle advancing control is not suitable since it operates the delay counter based on the delay amount corresponding to the rotational speed of the rotor 10a to adjust the advancing angle amount for the advancing angle energizing timing. Thus, in a low rotational speed state in which the rotational speed of the rotor 10a is lower than the predetermined value, the normal energizing timing, which can be easily generated based on the rotational position of the rotor 10a, is selected and rotational control is performed with the normal energizing timing. Such simple control prevents the motor efficiency from decreasing and noise and vibration from increasing. Further, the rotational drive of the brushless motor 10 is stabilized even from the period immediately after activation in which the rotational speed is extremely low. Also, during the rotational control with the advancing angle energizing timing, the advancing angle amount is optimized in accordance with the load state of the motor 10. Thus, even in the rotational speed range in which the control is switched to the advancing angle energizing timing, the motor efficiency is improved and noise and vibration are reliably reduced, so that the rotational drive of the motor is stabilized in this rotational speed range. Accordingly, the rotational drive of the motor 10 is stabilized in the all speed ranges including the low speed range.

(2) In the preferred embodiment, the control unit 17 calculates the advancing amount (a delay amount for the 120° advancing angle energizing timing) for the rotational speed at the present load state of the motor 10 based on the advancing angle amount (a delay amount for the 120° advancing angle energizing timing) for the rotational speed of the motor 10 at the maximum load and the minimum load. That is, at any load state of the motor 10, the advancing angle amount (the delay amount for the 120° advancing angle energizing timing) can be calculated from the maximum or minimum load. Thus, only the maps for the maximum and minimum loads need to be stored. Accordingly, the maps can be stored in a memory of a small capacity. This reduces the circuit scale of the control circuit 15 and costs.

(3) In the preferred embodiment, the control unit 17 detects the load state of the motor 10 based on the voltage applied to the motor 10. That is, since the applied voltage and the load state of the motor 10 have a correlation with each other, detection of the voltage applied to the motor 10 allows the load state of the motor 10 to be easily detected. Further, in the preferred embodiment, the voltage applied to the motor 10 is calculated from the duty ratio of the PWM control and the source voltage of the DC power supply E. Therefore, no voltage sensors are required.

(4) In the preferred embodiment, the drive timing generation unit 16 includes the basic timing generation unit 31 and the output switching unit 32. The basic timing generation unit 31 generates basic timings determined by rotational positions of the rotor 10a. The output switching unit 32 controls output signals from the AND circuits 41 to 46, thereby adjusting the basic timing to one of the normal energizing timing and the advancing angle energizing timing. More specifically, in the drive timing generation unit 16, the basic timing generation unit 31 generates common basic timings, and the normal and advancing angle energizing timings are selectively generated based on the common basic timings. The basic timing generation unit 31 and the output switching unit 32 form the drive timing generation unit 16 with a simple configuration.

(5) In the preferred embodiment, among the advancing angle energizing timings in intervals of 60°, the drive timing generation unit 16 generates a 120° advancing angle energizing timing, which is greater than the necessary advancing angle amount of 80° of the brushless motor 10 and is the minimum angle. The energizing of the three-phase stator coils 10u, 10v, and 10w is performed at 120° intervals in each phase, and the detection signals of the hall elements Hu, Hv, and Hw are output for each phase in 120° intervals. Thus, an advancing angle energizing timing having an advancing angle amount of 120° can easily be generated from the detection signals. Furthermore, since an advancing angle energizing timing having an advancing angle amount that is larger than the necessary advancing angle amount of 80° for the motor 10 and having the minimum angle is used. This prevents the delay amount generated when adjusting the advancing angle from increasing. Thus, the delay counter, which reflects the delay amount, may be simplified. This contributes to reduction in circuit scale of the control circuit 15 and reduction in costs. Further, errors in energizing timings would increase when the delay amount increases. However, in the preferred embodiment, since the delay amount is minimized, angle advancing control may be performed with high accuracy.

The preferred embodiment of the present invention may be modified as follows.

In the preferred embodiment, the voltage applied to the motor 10 is calculated from the duty ratio of the PWM control and the source voltage of the DC power supply E. However, a voltage sensor detecting the source voltage may be provided, and the voltage applied to the motor 10 may be calculated using the source voltage detected by the voltage sensor. Further, instead of detecting the load state of the motor 10 from the voltage applied to the motor 10, the load state of the motor 10 may be detected from a parameter other than the applied voltage.

In the preferred embodiment, the correlation maps of FIGS. 11 and 12 each include two maps, or a map for the maximum load and a map for the minimum load. A load state between the maximum load and the minimum load is calculated from the ratio between the maximum and minimum loads. However, a load state may be calculated based on one of the maximum load or the minimum load. Instead of the maps corresponding to the maximum load and the minimum load, a map corresponding to a predetermined load may be prepared. Other load states may be calculated based the map corresponding to the predetermined load.

In the preferred embodiment, although the switching from the normal energizing timing to the advancing angle energizing timing is not specified in step S6, the energizing of the motor 10 (coils 10u, 10v, and 10w) may be temporarily stopped to perform the switching.

More specifically, as shown in FIG. 10B, prior to step S6 in which switching to the advancing angle energizing timing is performed, step S12 may be inserted to temporarily deactivate the brushless motor 10. Then, after step S6, step S13 may be inserted to reactivate the brushless motor 10. When the normal energizing timing is switched to the advancing angle energizing timing during activation of the brushless motor 10, the two energizing timings may become mixed and cause an erroneous operation during the rotational control. However, such erroneous operations are prevented by temporarily deactivating the brushless motor 10 to perform the switching.

In the preferred embodiment, the drive timing generation unit 16, which serves as the normal timing generation unit and the advancing angle timing generation unit, is configured to generate a normal energizing timing and a 120° advancing angle energizing timing. However, the advancing angle amount of the advancing angle energizing timing may be changed to any value as long as it is greater than the necessary advancing angle amount (varies in accordance with the motor configuration). In this case, it is desirable that advancing angle energizing timings having 60° intervals (60°, 180°, 240°, and 300°) be used.

Figures 13, 14:
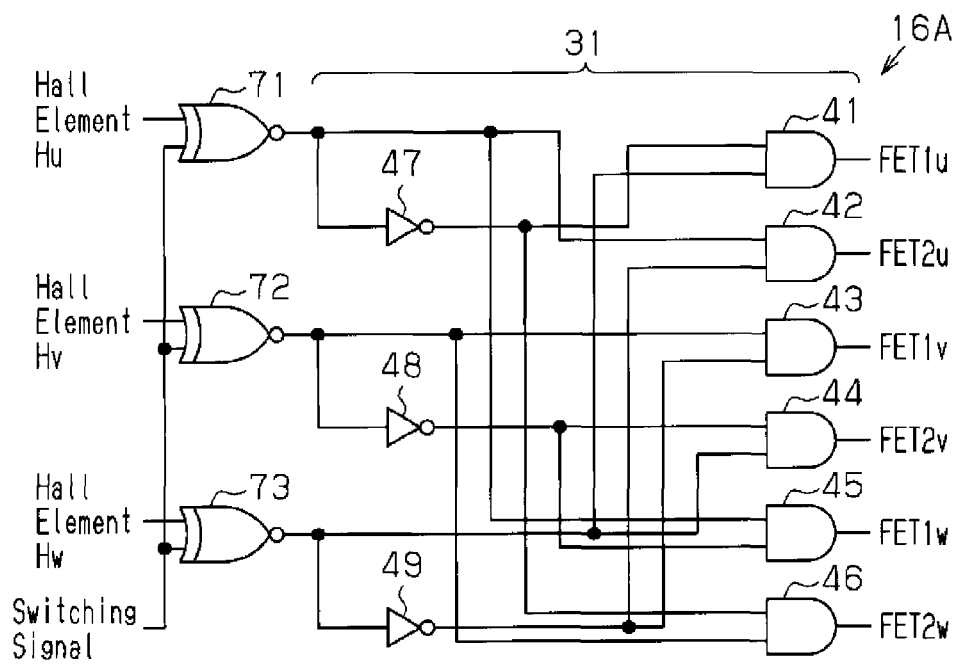
FIG. 13 is a truth table for a 180° advancing angle energizing timing.
FIG. 14 is a diagram illustrating a logic gate circuit of another example which generates a normal energizing timing and a 180° advancing angle energizing timing.

For example, as shown in FIG. 13, a drive timing generation unit 16A may be configured to generate a normal energizing timing and a 180° advancing angle energizing timing. FIG. 13 is a truth table for the 180° advancing angle energizing timing.

The drive timing generation unit 16A includes EX-NOR circuits 71 to 73. The EX-NOR circuits 71 to 73 each have a first terminal for respectively receiving detection signals from the hall elements Hu, Hv, and Hw in the basic timing generation unit 31 (the logic gate circuit 31x in FIG. 4). Second terminals of the EX-NOR circuits 71 to 73 each receive a switching signal. When the switching signal has an L level, the detection signals from the hall elements Hu, Hv, and Hw are directly input to the basic timing generation unit 31, and output signals of the normal energizing timing are output from the AND circuits 41 to 46, which serve as output circuits of the basic timing generation unit 31. When the switching signal shifts to an H level, inverted signals of the detection signals from the hall elements Hu, Hv, and Hw are input to the basic timing generation unit 31, and output signals of the 180° advancing angle energizing timing are output from the AND circuits 41 to 46, which serve as the output circuits of the basic timing generation unit 31. Then, ON/OFF-control of the FETs 1u, 2u, 1v, 2v, 1w, and 2w is performed by the output signals of the normal energizing timing and the 180° advancing angle energizing timing.

The drive timing generation unit 16A having such a configuration may be used in the brushless motor 10 of the preferred embodiment having the necessary advancing angle amount of 80°. The drive timing generation unit 16A is configured with less gates. This contributes reducing the circuit scale of the control circuit 15.

A logic gate circuit that generates advancing angle energizing timings having advancing angle amounts other than 120° and 180°, such as 60°, 240°, and 300°, may be easily configured by using the basic timing generation unit 31 and applying a circuit formed by any combination of logic gate circuits, such as AND circuits, OR circuits, and EX-NOR circuits.

In the preferred embodiment, the three hall elements Hu, Hv, and Hw are used as rotation sensors. However, the quantity of sensors is not limited to three, and, for example, one or two sensors may be used. Further, instead of hall elements, magnetic sensors or other types of sensors may be used as the rotation sensor.

In the preferred embodiment, the controller 11 is applied to the brushless motor 10, which is used as a blower motor for a vehicle air conditioner. However, the controller 11 may be applied to a brushless motor used for other purposes.

What is claimed is:

1. A brushless motor controller that performs rotational control for a brushless motor by detecting a rotational position and a rotational speed of a rotor based on a detection signal from a rotation sensor and determining an energizing timing of a three-phase stator coil based on the detected rotational position and rotational speed of the rotor, the brushless motor controller comprising:
   a load state detecting unit for detecting a load state of the motor;
   a normal timing generation unit which generates a normal energizing timing determined by the rotational position of the rotor;
   an advancing angle timing generation unit which generates an advancing angle energizing timing determined by the rotational position of the rotor and advanced by a predetermined amount from the normal energizing timing, generates a delay amount that changes in correspondence with the detected load state of the motor and the rotational speed of the rotor, and generates a final advancing angle energizing timing delayed by the delay amount from the advancing angle energizing timing; and
   a control switching unit which switches rotational control of the motor between a first rotational control executed when the rotational speed of the rotor is less than a predetermined value and a second rotational control executed when the rotational speed of the rotor is greater than or equal to the predetermined value, wherein the motor is controlled in accordance with the normal energizing timing in the first rotational control, and the motor is controlled in accordance with the final advancing angle energizing timing in the second rotational control.

2. The controller according to claim 1, wherein the advancing angle timing generation unit calculates the delay amount under the detected current load state of the motor, based on the delay amount at the maximum load or the minimum load of the motor.

3. The controller according to claim 1, wherein the load state detecting unit detects the load state of the motor based on a voltage applied to the motor.

4. The controller according to claim 1, wherein the control switching unit temporarily deactivates the motor when switching from the first rotational control to the second rotational control.

5. The controller according to claim 1, wherein the normal timing generation unit and the advancing angle timing generation unit include:
   a basic timing generation unit which generates a basic timing determined by the rotational position of the rotor; and
   an output switching unit controlled by the control switching unit to change the basic timing to one of the normal energizing timing and the advancing angle energizing timing from the basic timing.

6. The controller according to claim 1, wherein the advancing angle timing generation unit is configured to generate among the advancing angle energizing timings in intervals of 60°, an advancing angle energizing timing that is greater than a necessary advancing angle amount of the motor and is a minimum angle.

7. A brushless motor comprising the controller according to claim 1 formed integrally with the motor.

8. A method for controlling a brushless motor that performs rotational control for the brushless motor by detecting a rotational position and a rotational speed of a rotor and determining an energizing timing of a three-phase stator coil based on the detected rotational position and rotational speed of the rotor, the method comprising:
   detecting a load state of the motor;
   generating a normal energizing timing determined by the rotational position of the rotor;
   generating an advancing angle energizing timing determined by the rotational position of the rotor and advanced by a predetermined amount from the normal energizing timing;
   generating a delay amount that changes in correspondence with the detected load state of the motor and the rotational speed of the rotor;
   generating a final advancing angle energizing timing delayed by the delay amount from the advancing angle energizing timing;
   controlling the motor in accordance with the normal energizing timing when the rotational speed of the rotor is less than a predetermined value; and
   controlling the motor in accordance with the final advancing angle energizing timing when the rotational speed of the rotor is greater than or equal to the predetermined value.

* * * * *